Oct. 7, 1952 L. M. KEATING 2,613,015
WELDED TANK CONSTRUCTION
Filed March 29, 1948
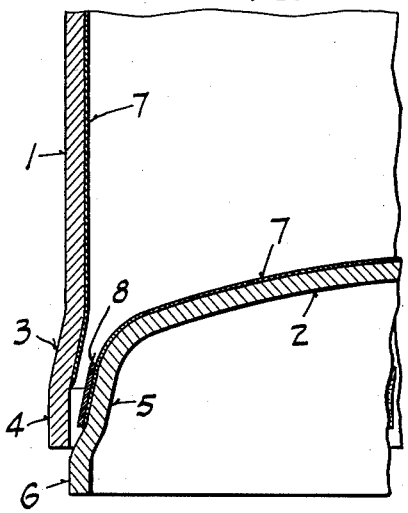
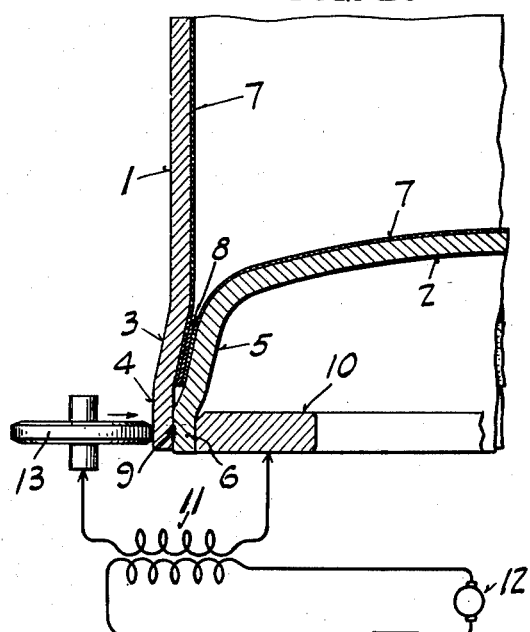
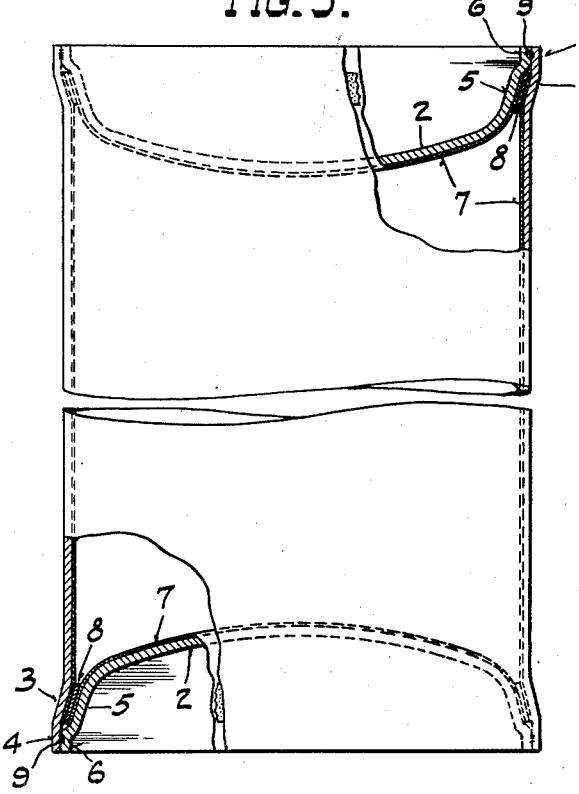
INVENTOR.
Leonard M. Keating
BY
Andrus & Scales
ATTORNEY.

Patented Oct. 7, 1952

2,613,015

UNITED STATES PATENT OFFICE 2,613,015

WELDED TANK CONSTRUCTION

Leonard Mathew Keating, Milwaukee, Wis., assignor to A. O. Smith Corporation, Milwaukee, Wis., a corporation of New York Application March 29, 1948, Serial No. 17,667

5 Claims. (Cl. 220—64)

This invention relates to the construction of welded tanks or the like and more particularly to the construction of domestic hot water heater storage tanks having a non-metallic corrosion resistance lining of ceramic enamel or the like.

The construction of ceramic enamel-lined tanks requires that the heads and shell be separately lined prior to assembly and welding, and generally involves a substantial overlapping of the enamel linings of the heads and shell adjacent the weld as set forth in the United States Letters Patent No. 2,263,021 to Otto Uecker for Domestic Hot Water Tank.

One object of the invention is to provide a hot water tank in which the heads and shell are cylindrical at the marginal end portions and accurately sized to facilitate a close concentric fit therebetween.

A further object is to provide a hot water tank in which the bare marginal end portions of the heads and shell are in complete engagement at the welding zones to provide for effective welding of the joints between the shell and heads.

Another object is to provide for slight axial adjustment of the head and shell of a hot water tank to compress an interposed non-metallic sealing element under variable tolerances while maintaining a complete resistance welding engagement between the head and shell.

Another object is to provide a tank shell and end heads therefor constructed for assembly with a gasket therebetween allowing relatively large tolerances for variations in the size and fit of the gasket while at the same time maintaining a fit within close tolerances of portions of the heads and shell for electric resistance seam welding together to complete the tank.

Another object is to facilitate the obtaining of a uniform predetermined tight fit of the parts.

These and other objects and advantages of the invention will be more fully described in the following description of a preferred embodiment of the invention as illustrated in the accompanying drawings.

In the drawings:

Figure 1 is an enlarged sectional view of a joint between the head and shell of a hot water tank;

Fig. 2 is a view similar to Figure 1 showing the welding of the parts; and

Fig. 3 is an elevational view of a hot water tank with parts broken away and sectioned.

The tank shown in the drawings comprises a generally cylindrical shell 1 which is closed at each end by the convex concave heads 2.

Each end portion of shell 1 has a flared or conical section 3 which terminates in a cylindrical marginal end flange 4. The flange of head 2 comprises a flared or conical section 5 formed complementary to flared section 3 of the shell and terminating in a cylindrical marginal end flange 6 concentric to flange 4 of the shell.

The heads 2 and shell 1 are lined with a protective coating, such as ceramic enamel 7, which is fused to the inside of these members under temperatures approximately 1600° F. The ceramic lining 7 extends on the shell substantially to cylindrical flange 4, and on the heads substantially to the cylindrical end flange 6 leaving the end flanges 4 and 6 bare for welding, as will be described.

Shell 1 and heads 2 overlap at their respective flared portions 3 and 5 for a substantial distance, and the corrosion resistant gasket or non-metallic sealing member 8 is interposed therebetween to seal the joint between the head and shell against circulation of contained fluid and prevent injury to the lining of the tank therebetween.

The concentric cylindrical end flanges 4 and 6 of the shell and head, respectively, are joined by the weld 9, which is made by electric resistance welding and comprises a seam weld around the circumference of the tank made, as will be described hereinafter.

In making the shell 1, the shell end portions may first be flared and then the marginal end flanges 4 formed to a generally cylindrical shape leaving section 3 of the shell end portion of a generally conical shape. The end flange 4 extends longitudinally of the shell for a substantial distance.

In making the head, the flange of the head may first be formed with a flare and then the marginal end flange 6 be formed to a generally cylindrical shape leaving section 5 of the head flange of a generally conical shape. The end flange 6 extends longitudinally of the head for a substantial distance.

Due to the cylindrical end flanges of the shell and head, these members can be accurately sized for a close fit therebetween and this operation is carried out before enameling and previous to the final assembly of the shell and head.

In assembling the tank, the end heads 2 are inserted in the ends of shell 1 with gaskets 8 disposed tightly between the overlapping end flared portions 3 and 5 of the shell and heads respectively. The flanges 4 and 6 also overlap longitudinally for a substantial distance.

At each joint the overlapping engagement between gasket 8 and the ceramic enameled conical portion of shell 1 and head 2 is of sufficient width to provide an adequate water-tight seal to prevent water from circulating to the unenameled surfaces of flanges 4 and 6 and the welds 9. The end head 2 when fitted into the shell 1 compresses gasket 8 radially to seal off the joint between the shell and head. The flanges 4 and 6 are then welded together by the electric resistance seam weld 9. Weld 9 may be a continuous weld or overlapping line welds. In the welding operation a ring electrode 10 is fitted inside flange 6, and is connected to one lead of a transformer 11, energized from a source of electric current 12. A roller electrode 13, which is connected to the other lead of transformer 11 is rotated and moved about the outer circumference of shell flange 4. Suitable pressure means, not shown, is employed to hold the electrode in good electrical engagement with the work to insure a sound weld around the circumference of the tank.

The tolerance limits of the thickness or size of gasket 8 are not critical since the effectiveness of the contact of the head and shell for making weld 9 is not disturbed by the tolerance differences as the head and shell can be moved axially relative to each other and the contact at the welding zone maintained due to the overlapping cylindrical end flanges 4 and 6. There also may be some tolerance differences in lining 7 as well as in the head and shell themselves at the conical joint area without disturbing the welding contact of the overlapping end flanges 4 and 6 of the head and shell respectively.

The invention, therefore, eliminates the necessity of close tolerances to obtain the desired fit between the parts and thus provides a tank joint at less cost and one which will be effective in preventing leakage of the contents of the tank.

Various embodiments of the invention may be employed within the scope of the accompanying claims.

I claim:

1. A welded structure comprising two overlapping sheet metal parts having corresponding conically-shaped sections terminating in cylindrical marginal ends adapted to contact each other for a substantial distance axially of the structure, a ceramic enamel lining extending over the overlapping parts and leaving the cylindrical marginal ends of the parts bare for welding, and the marginal ends providing for relative axial adjustment of the parts to compensate for tolerance differences in the parts and said lining without interfering with the contact of said ends, and an electric resistant weld joining said marginal ends.

2. A welded structure comprising two overlapping sheet metal parts having corresponding conically-shaped sections terminating in cylindrical marginal ends adapted to contact each other for a substantial distance axially of the structure, a ceramic enamel lining extending over the overlapping parts and leaving the cylindrical marginal ends of the parts bare for welding, a non-metallic sealing member interposed between the conically-shaped sections of the parts, and the marginal ends providing for relative axial adjustment of the parts to compensate for tolerance differences in said sealing member without interfering with the contact of said ends, and an electric resistance weld joining said marginal ends.

3. A welded hot water tank comprising a head and shell having corresponding conically-shaped sections overlapping each other and terminating in cylindrical marginal ends adapted for contact with each other for a substantial distance axially of the tank, a ceramic enamel lining extending on the inside of the shell and head and leaving the cylindrical marginal ends of the same bare for welding, a non-metallic sealing member interposed between the conically-shaped sections of the shell and head, and the marginal ends of said sections providing for relative axial adjustment of the shell and head to compensate for tolerance differences in said sealing member without interfering with the contact of said ends, and a circumferentially extending electric resistance weld joining said marginal ends of the shell and head together.

4. A welded hot water tank comprising a head and shell having corresponding conically-shaped sections overlapping each other and terminating in cylindrical marginal ends adapted for contact with each other for a substantial distance axially of the tank, a non-metallic sealing member of substantial thickness interposed between the conically-shaped sections of the head and shell, and the marginal ends of said sections providing for relative axial adjustment of the shell and head to compensate for tolerance differences in said non-metallic member, and an electric resistance weld joining said marginal ends of the shell and head together around the tank.

5. A hot water tank comprising a generally cylindrical shell and an end head therefor, said shell having an end section flared outwardly and terminating in a cylindrical end flange of substantial length and said head having a flange fitting within the end of the shell and flared and formed cylindrically at the outer end complementary to the end section of the shell, a ceramic enamel lining extending on the inside of the shell and head of the tank to a line leaving the cylindrical ends of the shell and head free for welding, a non-metallic corrosion resistant gasket disposed between the shell and head at the overlapping sections thereof with said cylindrical ends providing for relative axial adjustment of the shell and head to squeeze the gasket therebetween under a radial pressure to seal the approach to the joint, and an electric resistance weld joining the shell and head ends together around the tank.

LEONARD MATHEW KEATING.

REFERENCES CITED

The following references are of record in the file of this patent:

UNITED STATES PATENTS

| Number | Name | Date |
|---|---|---|
| 1,282,797 | Fouts | Oct. 29, 1918 |
| 1,298,968 | Lambert | Apr. 1, 1919 |
| 2,263,021 | Uecker | Nov. 18, 1941 |
| 2,290,903 | Ansel | July 28, 1942 |
| 2,348,696 | Schabacker | May 9, 1944 |
| 2,350,720 | Brodie | June 6, 1944 |
| 2,444,833 | Lampert | July 6, 1948 |
| 2,480,376 | Martin | Aug. 30, 1949 |